(12) United States Patent
Kelly

(10) Patent No.: US 10,716,367 B2
(45) Date of Patent: Jul. 21, 2020

(54) CONNECTOR

(71) Applicant: FM IP LIMITED, North Shore (NZ)

(72) Inventor: Gregory John Kelly, Auckland (NZ)

(73) Assignee: Fastmount Limited, North Shore (NZ)

( * ) Notice: Subject to any disclaimer, the term of this patent is extended or adjusted under 35 U.S.C. 154(b) by 91 days.

(21) Appl. No.: 16/171,702

(22) Filed: Oct. 26, 2018

(65) Prior Publication Data
US 2019/0125037 A1    May 2, 2019

(30) Foreign Application Priority Data
Oct. 27, 2017  (NZ) ........................................ 736750

(51) Int. Cl.
| | | |
|---|---|---|
| *A44B 11/25* | (2006.01) | |
| *A47C 7/02* | (2006.01) | |
| *B63B 29/04* | (2006.01) | |
| *B60N 2/60* | (2006.01) | |
| *F16B 21/16* | (2006.01) | |
| *F16B 5/06* | (2006.01) | |

(52) U.S. Cl.
CPC ........ *A44B 11/2592* (2013.01); *A47C 7/0213* (2018.08); *B60N 2/6027* (2013.01); *B63B 29/04* (2013.01); *F16B 5/0692* (2013.01); *F16B 21/16* (2013.01); *B63B 2029/043* (2013.01)

(58) Field of Classification Search
CPC ........... Y10T 24/4599; Y10T 24/45052; Y10T 24/45005; Y10T 24/45723; Y10T 24/45728; Y10T 24/45094; Y10T 24/45801; Y10T 24/45796; Y10T 279/17786; A44C 5/2057; A44C 5/0053
See application file for complete search history.

(56) References Cited

U.S. PATENT DOCUMENTS

| | | |
|---|---|---|
| 5,894,641 A | 4/1999 | Hurtz et al. |
| 6,761,411 B2 | 7/2004 | Boehmer et al. |
| (Continued) | | |

FOREIGN PATENT DOCUMENTS

| | | |
|---|---|---|
| DE | 10209240 C1 | 4/2003 |
| FR | 3038019 A1 | 12/2016 |
| WO | 9635344 A1 | 11/1996 |

OTHER PUBLICATIONS

Foreign Communication for related application—Extended European Search Report for European Patent Application No. 18202900.9-1010, dated Mar. 7, 2019, 8 pages.

(Continued)

*Primary Examiner* — Robert Sandy
(74) *Attorney, Agent, or Firm* — Conley Rose, P.C.; Rodney B. Carroll

(57) ABSTRACT

A connector for a soft or flexible article, the connector including a male structure having a base and a projection, the projection defining a head and a stem connecting the head to the base, the male structure base defining at least one tag extending substantially perpendicular to the projection. The connector includes a carriage structure having a base which defines a socket arranged to receive the projection of the male structure, the carriage structure defining at least one tag extending substantially parallel to the socket. The connector also provides a guide structure which defines a guide cavity arranged to receive the male structure projection when the male structure projection is located within the socket of the carriage structure, the guide cavity defining an entry zone and a compression zone.

16 Claims, 6 Drawing Sheets

(56) References Cited

U.S. PATENT DOCUMENTS

2003/0214167 A1 11/2003 Boehmer et al.
2004/0025306 A1 2/2004 Coffey
2018/0180083 A1 6/2018 De Marco et al.

OTHER PUBLICATIONS

Foreign Communication for related application—Australian Examination Report No. 1 for Australian Patent Application No. 2018253602, dated Jun. 6, 2019, 4 pages.

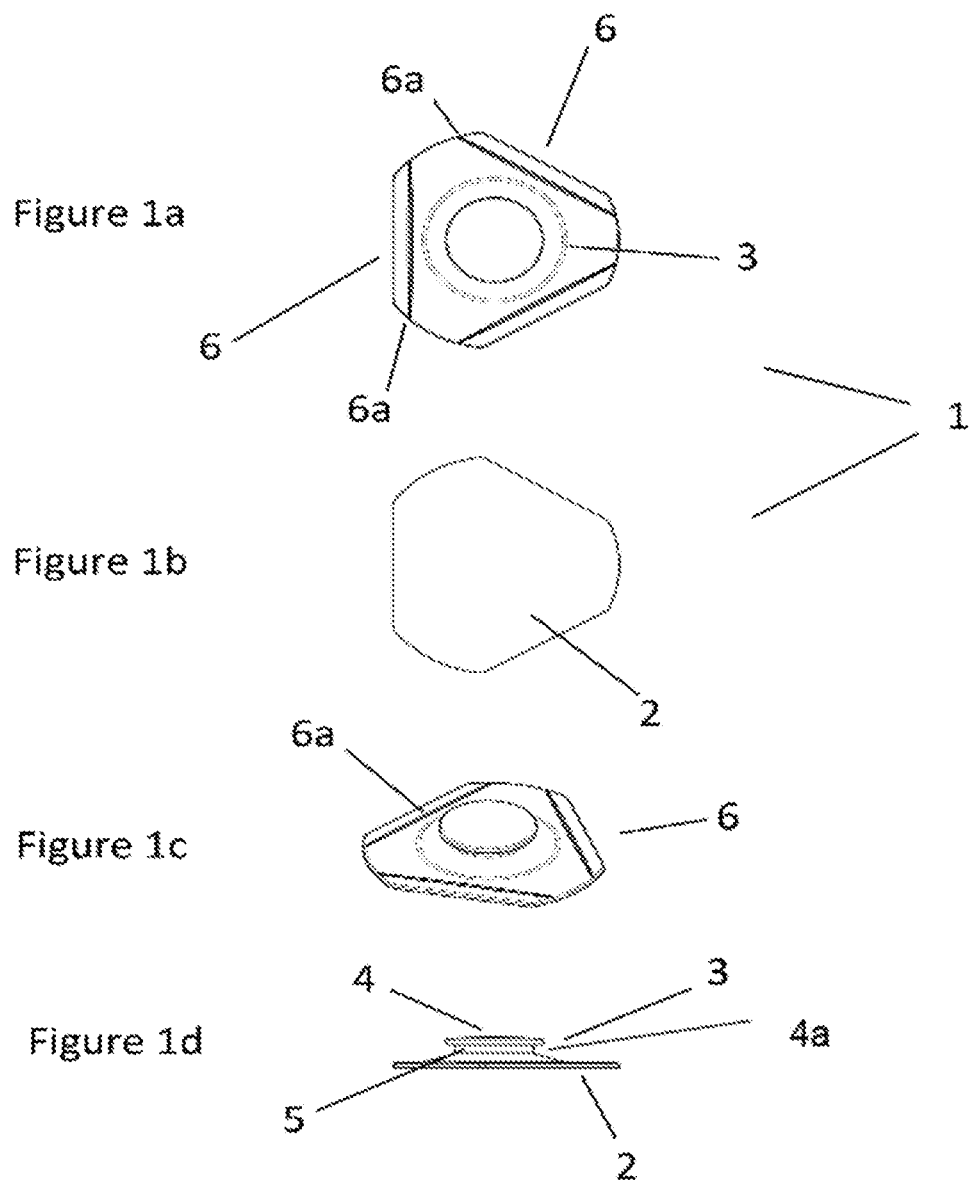

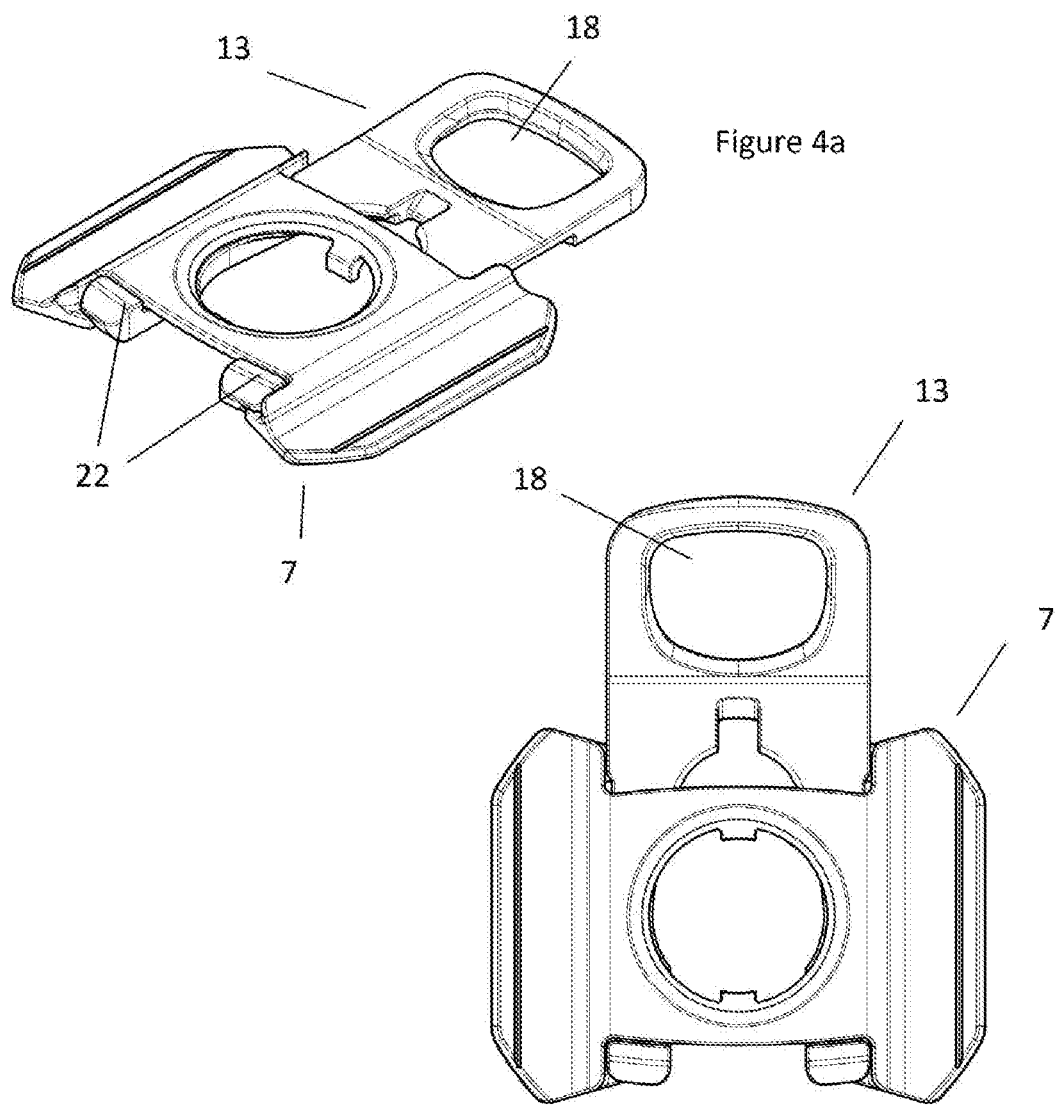

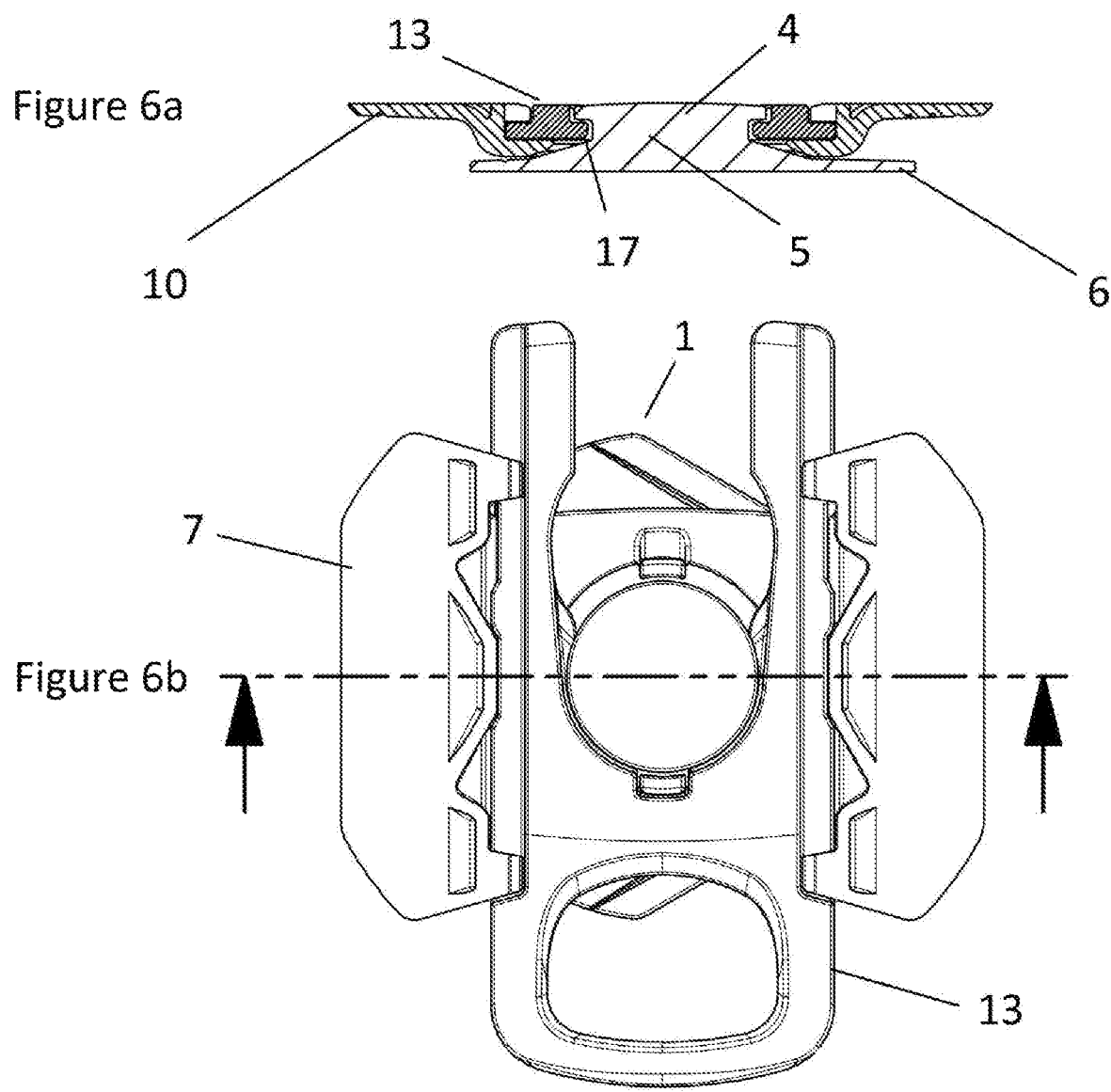

CONNECTOR

CROSS-REFERENCE TO RELATED APPLICATIONS

This Application claims priority to New Zealand Patent Application No. 736750 filed Oct. 27, 2017, which is incorporated by reference herein in its entirety.

TECHNICAL FIELD

This invention relates to a connector. In preferred embodiments the connector provided can be used to engage an article which has a flexible exterior surface.

BACKGROUND

In a number of applications there is a need to provide a connection to an article covered with or composed of a soft flexible material. For example vehicles such as boats, aircraft and motorhomes contain cushions or squabs used in combination with various articles of furniture. Squabs and the furniture they are matched with are upholstered with fabrics and incorporate soft internal padding or stuffing materials.

In some situations a squab may need to be removed from a piece of furniture and stowed securely when vehicle maneuvers are underway. For example, this situation can occur in rough weather when experienced by boats or with aircraft flying through turbulent air.

It is preferable to have the ability to secure squabs to articles of furniture with connectors which can be engaged quickly and easily, and which also allow for quick and easy disconnections. It is also preferable for such connectors to be hidden from view once engaged, which can make the operation of the connector difficult when a clear line of sight is unavailable.

In the case of squabs it is also preferable for the connector used to have a relatively flat or low profile, preventing its components from pressing into the body of a person in contact with and compressing the material of the squab.

Due to the soft and/or flexible nature of these types of articles the provision of an effective connector system present some challenges. One problem is that the flexible nature of textile upholstery makes connections to an intermediate rigid connector susceptible to stress and fatigue over time—potentially resulting in the fabric eventually ripping.

It would therefore be of advantage to have an improved connector which addressed any or all of the above issues, or at least that provided an alternative choice to the prior art. In particular it would be of advantage to have an improved connector which could provide a strong secure connection between two soft or flexible surfaces. A connector used in such applications which could be quickly and easily engaged and disengaged from a number of angles of attack—preferably without line of sight—would also be of advantage. An improved connector which could be used in these applications and which has a relatively flat or low profile would also be of advantage.

SUMMARY OF INVENTION

According to one aspect of the present invention there is provided a connector for a soft and/or flexible article, the connector including a male structure comprising a base and a projection, the projection defining a head and a stem connecting the head to the base, the head having a diameter greater than the diameter of the stem, the male structure base defining at least one tag extending substantially perpendicular to the projection, and a carriage structure comprising a base which defines a socket arranged to receive the projection of the male structure, the carriage structure defining at least one tag extending substantially parallel to the socket, and a guide structure which defines a guide cavity arranged to receive the male structure projection when the male structure projection is located within the socket of the carriage structure, the guide cavity defining an entry zone and a compression zone, the entry zone having a diameter greater than the diameter of the male structure projection head and the compression zone having a diameter less than the diameter of the male structure projection head, wherein movement of the carriage structure relative to the guide cavity from the entry zone to the compression zone compresses at least a portion of the perimeter of the carriage structure socket between the guide structure and the base of the male structure.

According to another aspect of the present invention there is provided a connector for engaging flexible articles, the connector including a male structure formed from a base and a projection, the projection defining a head and a stem connecting the head to the base, the head having a diameter greater than the diameter of the stem, the male structure base defining at least one stitching tag extending substantially perpendicular to the projection, and a carriage structure formed from a base which defines a socket arranged to receive the projection of the male structure, the carriage structure defining at least one stitching tag extending substantially parallel to the socket, and a guide structure which defines a guide cavity arranged to receive the male structure projection when located within the socket of the carriage structure, the guide cavity defining an entry zone and a compression zone, the entry zone having a diameter greater than the diameter of the male structure projection head and the compression zone having a diameter less than the diameter of the male structure projection head, wherein movement of the carriage structure along the length of the guide cavity from the entry zone to the compression zone compresses at least a portion of the perimeter of the carriage structure socket between the guide structure and the base of the male structure.

According to a further aspect of the present invention there is provided a connector substantially as described above wherein movement of the carriage structure relative to the length of the guide cavity from the entry zone to the compression zone applies a force which urges the male structure projection through and away from the socket of the carriage structure.

According to a further aspect of the present invention there is provided a connector substantially as described above wherein movement of the carriage structure relative the guide cavity from the entry zone to the compression zone engages the guide structure with the stem of the male structure projection and prevents the head of the male structure projection from being withdrawn from the socket of the carriage structure.

According to another aspect of the present invention there is provided a connector substantially as described above wherein said at least one tag of the male structure is formed from a flexible material.

According to a further aspect of the present invention there is provided a connector substantially as described above wherein said at least one tag of the carriage structure is formed from a flexible material.

Preferably the connector provided by the invention is formed from a male structure to be fixed to a first fabric covered article, and a carriage structure to be fixed to a second fabric covered article. A further guide structure is also provided as a part of the connector, this guide being used to engage and disengage the other elements of the connector with each other.

The base of each carriage and male structure may each define one or more tag used to allow a flexible connection to the articles to be connected. The connection may comprise stitching.

A stitching tag may be formed from a soft and/or flexible material which allows each structure to be sewn on to a fabric or textile surface. Sewn connections are strong yet flexible ways of engaging components together and also are unlikely to fatigue over time with prolonged use.

In preferred embodiments the base of either or both the carriage and male structures may define a plurality of stitching tags. Several stitching tags may be disposed around the perimeter of these structures to provide multiple points of attachment and to resist separation forces applied from a number of directions.

In various preferred embodiments either or both of the entire carriage and/or male structures may be formed from a soft flexible material which facilitates stitched connections to a flexible article. For example, in one embodiment both the male structure and carriage structure may be moulded entirely from soft nylon material, with each stitching tag defining a line or region with a limited thickness through which stitches can be sewn.

However, in alternative embodiments these structures may not necessarily be entirely moulded from soft or flexible materials. For example, in alternative embodiments either or both of these structures may have a soft flexible material co-moulded over another rigid material to define the stitching tag and base required.

Reference in general throughout this specification will however be made to both the male structure and carriage structure being moulded entirely from a soft flexible material such as nylon. Again, those skilled in the art will appreciate that alternative arrangements of the invention are envisioned for other embodiments and reference to the above should in no way be seen as limiting.

The base of the male structure may define a projection which extends with a substantially perpendicular orientation to any stitching tag or tags formed by the structure. This projection is formed from a stem which extends from the base and which terminates in a head, where the head of the projection has a diameter greater than that of the stem. This arrangement of the stem and the head therefore forms an undercut region next to the stem between the head and the base of the structure.

The base of the carriage structure also defines a socket arranged to receive the male structure projection, with this socket being aligned approximately parallel to any stitching tags defined by the carriage structure. This socket is defined by an aperture with a substantially complementary form or shape to that of the head of the male structure projection and preferably has a diameter, width or length substantially equal to or slightly larger than the diameter of the head of the male structure projection.

The connector's guide structure may also define a guide cavity. When the three components of the connector are assembled together this guide cavity may be used to receive the male structure's projection when the projection is inserted through the socket of the carriage structure. The assembled arrangement may therefore sandwich the carriage structure between the male structure and the guide structure, with both sets of stitching tags extending substantially parallel to one another. This arrangement may result in the assembled connector also having a relatively low profile or restricted height, which is dictated by the height or extent of the male structure projection.

The guide cavity formed in the guide structure is arranged to at least partially enclose a section of the male projection, where this cavity has a span, width or diameter which varies over the longitudinal length of the cavity. This variation in the diameter of the cavity defines separate zones within the cavity, being an entry zone and a compression zone. The diameter of the entry zone may be greater than the diameter of the male structure projection head, while the diameter of the compression zone is less than the diameter of the male structure projection head. This arrangement allows the projection head to be freely inserted into and potentially through the entry zone, while the three parts of the connector will be firmly engaged together when the projection extends into and potentially through the compression zone.

Preferably the guide structure may be formed from a rigid or hard material. These types of materials will resist compression forces, allowing the material of the guide structure to act to compress and trap various parts of the male and carriage structures respectively. In a further preferred embodiment the guide structure may be moulded from transparent polycarbonate. Polycarbonate has a low visual impact and is a strong and incompressible material, compared to nylon and various mouldable plastics.

In a preferred embodiment a carriage track formed on the guide structure may also incorporate a lateral undulation, projection or recess used to mark the point of transition between the guide cavities entry zone and compression zone. This feature can provide an operator of the connector with vibration and sound-based feedback indicating that the carriage has transition between these two zones. Furthermore, this form of lateral undulation can also resist inadvertent movement of the carriage structure out of either zone unless a threshold force is applied to move the carriage.

In a preferred embodiment the restricted or reduced diameter of the guide cavities compression zone may be formed by a projecting ledge extending around the perimeter of this zone within the guide cavity. This projecting ledge will therefore act to translate the head of the male projection structure in a direction perpendicular to the direction of travel of the carriage, preferably acting to push the head through the guide cavity and to engage the sidewalls of the cavity with the stem of the male projection.

In a further preferred embodiment an angled ramping surface may be formed at the ends of this projecting ledge to smoothly transition the head of the male structure projection on to the ledge as it travels through to the compression zone.

In a preferred embodiment the guide structure may define an aperture which can be used by an operator as a handle or finger pull system to move the carriage structure relative to the guide structure. In a further preferred embodiment this handle aperture may be formed at one end of the guide structure, providing the operator with information on the orientation of the assembled connector without necessarily having line of sight to the connector.

Reference in general will be made in this specification to the connector provided being used to connect together to soft or flexible articles, preferably being covered by fabric or textiles. Those skilled in the art will appreciate that references made to soft or flexible articles also encompasses articles covered or coated in soft or flexible materials. In such embodiments a flexible connection may be made between these articles and the connector, where the connector acts as an intermediary element to connect to articles together.

Reference in general will also be made in this specification to these articles being a cushion or squab which is to be connected to a fabric or textile covered furniture structure. Again, those skilled should appreciate that the invention may be used in other applications as desired.

References made in this specification to the diameter of a feature, element or component of the connector relate to embodiments where such a component has a symmetrical or regular nature. Those skilled in the art will appreciate that the invention may be readily adapted to employ non-symmetrical or non-regular components and such references to diameters per se should be interpreted relative to the appropriate with length, width or depth dimension of such equivalent components.

Reference in general in this specification will however be made to the guide structure defining a pair of tracks located on opposite exterior edges of the guide structure. Again, however those skilled in the art will appreciate that alternative arrangements are also envisioned for other embodiments.

As used herein the term 'diameter' refers broadly to transverse measurement of something; width or thickness, and is not limited to the width or thickness of a circle or prism, for example.

As used herein the term 'socket' refers broadly to opening or a cavity into which an inserted part is designed to fit and is not limited to a hollow or cavity.

As used herein the term 'cavity' refers broadly to any empty space within a solid object, is not limited to an enclosed volume and includes, for example, a cavity formed by a U-shaped planar object.

As used herein the determiners 'a' or 'an' is not limited to meaning 'one' of the relevant noun or article and does not exclude, for example, 'another' article.

As used herein the term 'compress' refers broadly to press together or between and does not require, for example, macroscopic deformation.

As used herein the conjunction 'or' is used non-exclusively so, for example, A or B does not exclude A and B. To give an example, "soft or flexible article" includes any article that is soft and includes any article that is flexible and does not exclude flexible articles that are soft or exclude soft articles that are flexible.

As used herein the terms 'comprise' or 'comprising' are not intended to refer to a complete set of features, for example, so an article 'comprising' a component may also 'comprise' another component.

BRIEF DESCRIPTION OF THE DRAWINGS

An example embodiment of the invention is now discussed with reference to the drawings in which:

FIG. 1a shows an underside view of a male structure provided in accordance with a preferred embodiment, FIG. 1b shows a top view of the male structure of FIG. 1a, FIG. 1c shows a perspective underside view of the male structure of FIGS. 1a and 1b, FIG. 1d shows a side view of the male structure of FIGS. 1a-1c.

DETAILED DESCRIPTION

Figure 2A:
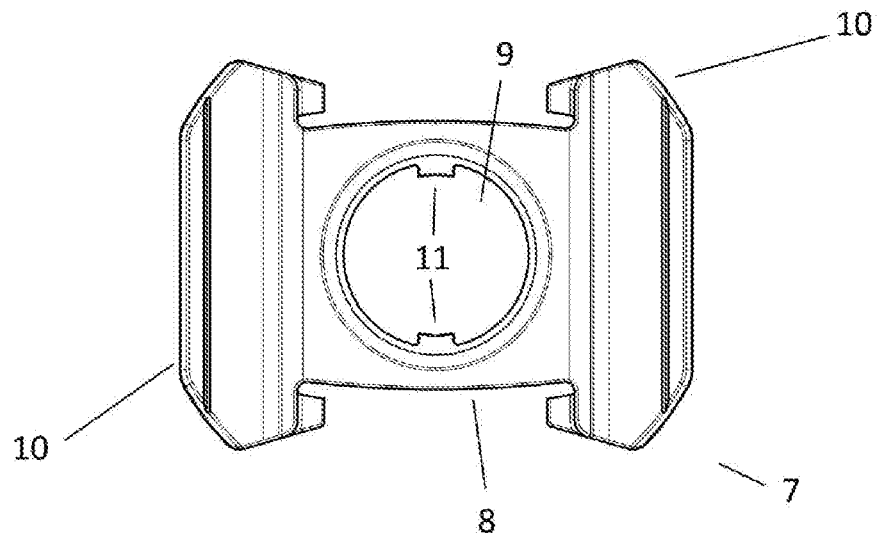
FIG. 2a shows a top view of a carriage structure used in combination with the male structure of FIGS. 1a-1d.

FIGS. 1a-1d show a number of views of a male structure which forms part of a connector provided in accordance with a preferred embodiment.

The male structure 1 includes a base 2 and a projection 3. The projection is formed from a head 4 and a stem 5 used to connect the head 4 to the base 2. As can be seen from FIG. 1d in particular, the head 4 has a diameter greater than the diameter of the stem 5. This results in an undercut region 4a below the head 4 and above the base 2 adjacent to the stem 5.

The base 2 also defines three stitching tags 6 extending substantially perpendicular to the projection 3. Each tag 6 includes a linear region 6a of reduced thickness which is used to receive stitches employed to sew the male structure to a flexible surface.

Figure 2B:
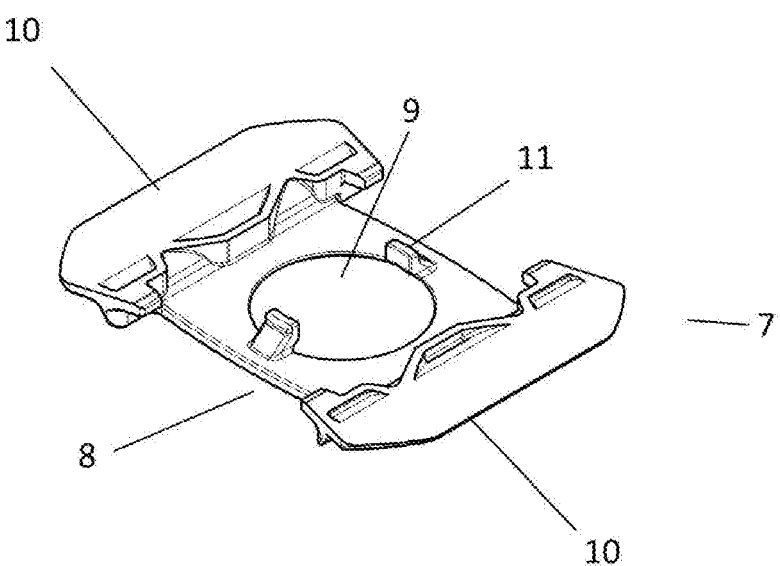
FIG. 2b shows an underside perspective view of the carriage structure of FIG. 2a, FIG. 2c shows a side view of the carriage structure of FIGS. 2a and 2b.
Figure 2C:
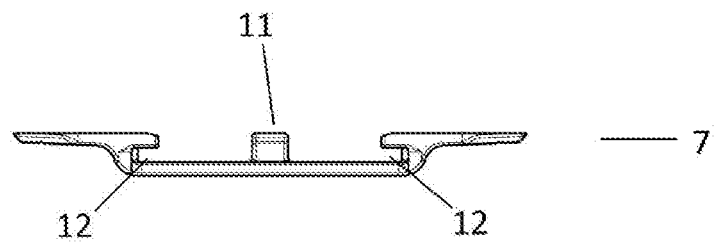

FIGS. 2a-2c show a number of views of a carriage structure 7 provided in accordance with the same embodiment illustrated with respect to the male structure of FIGS. 1a-1d.

The carriage structure 7 includes a base 8 which defines a socket 9 arranged to receive the projection of the male structure. The diameter of the socket 9 is greater than the diameter of the projection head 4.

The carriage structure base 8 defines two stitching tags 10 extending substantially parallel to the socket and located on opposite sides of the structure. Again, each stitching tag 10 includes a linear region 10a of reduced thickness which is used to receive stitches employed to sew the carriage structure to a flexible surface.

The base 8 of the carriage structure 7 also defines two travel stops 11 used to impede motion of the carriage structure 7 past a certain point on the guide structure 13 discussed below with respect to FIGS. 3a and 3b. Also defined by the base is a pair of complimentary recesses 12 which engage with features of the guide structure again discussed below with respect to FIGS. 3a and 3b.

Figure 3A:
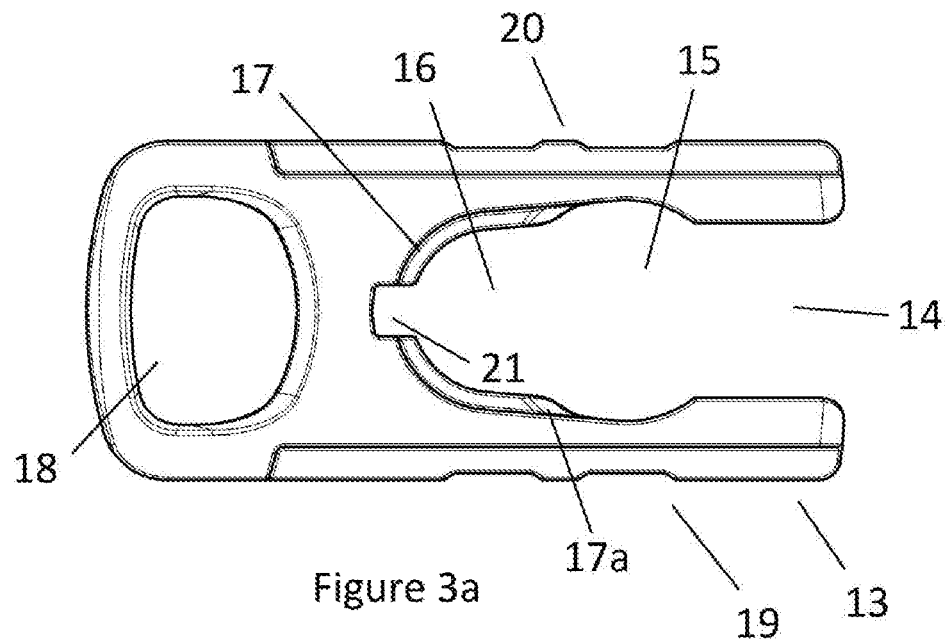
FIG. 3a shows a top view of a guide structure used in combination with the male structure of FIGS. 1a-1d and the carriage structure of FIGS. 2a-2c.
Figure 3B:
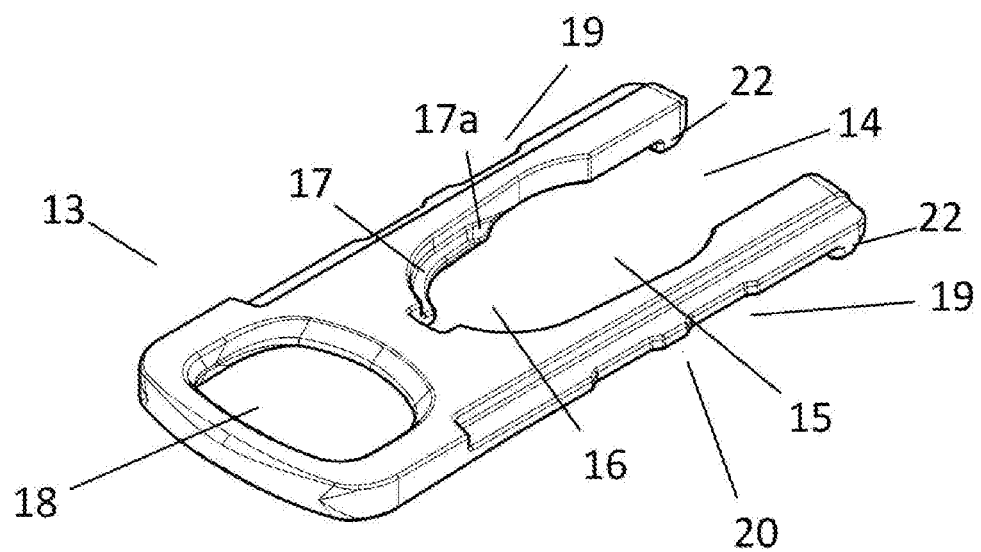
FIG. 3b shows a perspective view of the guide structure of FIG. 3a, FIGS. 4a and 4b show perspective and top views of the combination of the carriage and guide structures of FIGS. 2 and 3, FIGS. 5a, 5b and 5c show a number of underside perspective views illustrating various configurations of the male, carriage and guide structures of FIGS. 1-3, and FIGS. 6a and 6b show an underside view and side cross-section view of the assembled engaged connector illustrated with respect to FIG. 5c.

FIGS. 3a and 3b show a pair of views of a guide structure 13 used in combination with the male structure of FIGS. 1a-1d and the carriage structure of FIGS. 2a-2c.

The guide structure 13 defines an open-ended guide cavity 14 arranged to receive the male structure projection 3 when located within the socket 9 of the carriage structure 7. In the example shown the open-ended guide cavity is U-shaped.

The guide cavity 14 defines an entry zone 15 and a compression zone 16, where the entry zone has a diameter greater than the diameter of the male structure projection head 4. The compression zone has a diameter less than the diameter of the male structure projection head 4. The reduced diameter of the compression zone is formed by the provision of a projecting ledge 17 extending around the perimeter of this zone within the guide cavity 14. An angle ramping surface 17a is formed at the ends of the projecting ledge to smoothly transition the head of the male structure projection on to the ledge as it travels relative to the guide structure 13 through to the compression zone 16.

The guide structure 13 defines a finger pull aperture 18 which can be used by an operator to move the carriage structure relative to the guide structure. As can be seen from FIGS. 3a and 3b the finger pull aperture 18 is formed at one end of the guide structure 13, providing the operator with information on the orientation of the assembled connector without necessarily having line of sight to the connector.

The guide structure 13 defines a pair of tracks 19, each located on the opposite exterior edge of the guide structure running the length of the guide cavity. Each track 19 has a longitudinal axis running parallel to the longitudinal axis of the guide cavity 14.

These tracks 19 have a complimentary form to the recesses 12 formed in the carriage structure 7 which engage together to guide or control the motion of the carriage as it traverses the guide cavity.

Each track 19 incorporates lateral undulations 20 used to mark the point of transition between the guide cavities entry zone 15 and compression zone 16. As the carriage structure moves over these undulations they provide an operator of the connector with vibration and sound-based feedback indicating that the carriage has transition between these two zones. These features also resist inadvertent movement of the carriage structure out of either zone unless a threshold force is applied to move the carriage.

At the inner closed end of the guide cavity a stop recess 21 is provided to receive one of two travel stops 11 formed in the carriage structure 7. At the opposite open end of the guide cavity a pair of stop projections 22 are provided to stop the movement of the carriage structure off the end of the guide structure.

During use the carriage structure and guide structure are engaged together as shown with respect to FIGS. 4a and 4b. The stitching tags of the carriage structure 7 are sewn to a flexible surface of an article to be connected using the invention. FIGS. 4a and 4b show the carriage structure socket located over the entry zone of the guide structure. The carriage 7 and guide 13 structures are engaged together by the tracks 19 of the guide engaging with the complimentary recesses 12 of the carriage structure. Each of the stop projections 22 prevent further movement of the carriage structure away from the finger pull aperture 18 of the guide structure 13, while the tracks 19 and recesses 12 work together to control motion of the carriage towards the finger pull aperture 18.

Figure 5A:
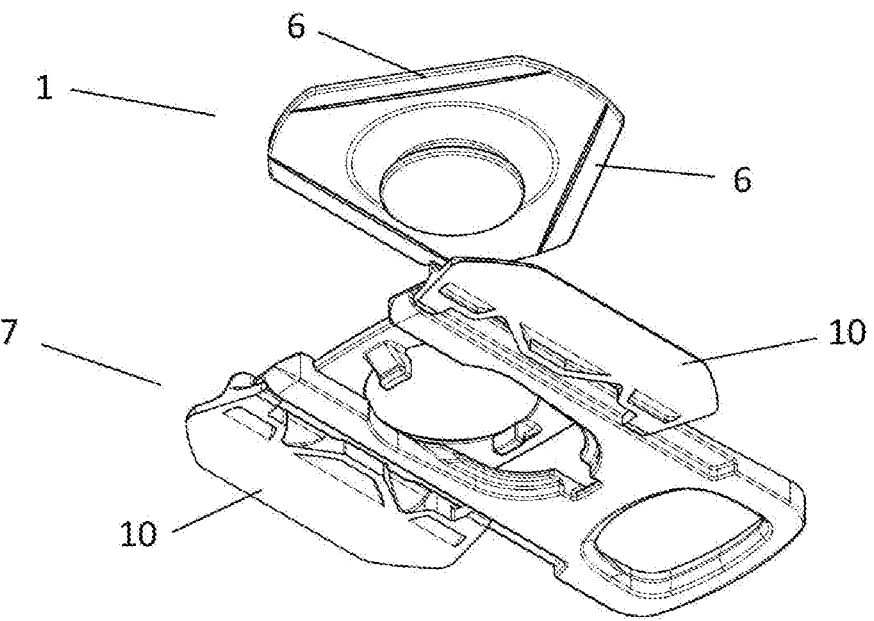

FIG. 5a shows an underside perspective of the engaged guide 13 and carriage 13 structures shown in FIG. 4 when positioned adjacent to the male structure of FIG. 1. In this arrangement the article sewn to the tags 6 of the male structure is disconnected from the article sewn to the tags 10 of the carriage structure. These stitched connections are facilitated by each of these structures being moulded from soft nylon in the embodiment shown.

Figure 5B:
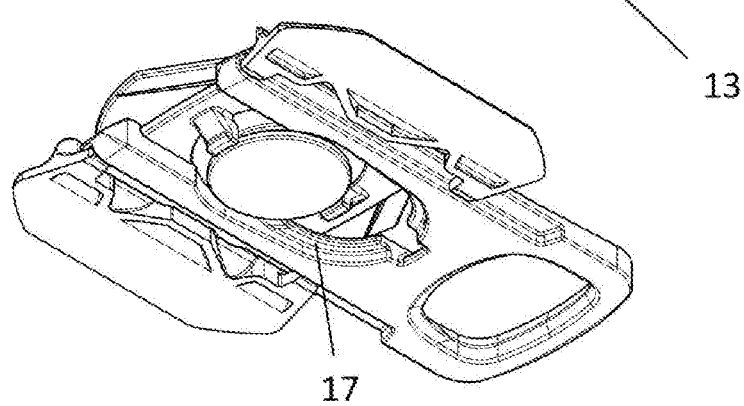

FIG. 5b shows the configuration of these structures when the male projection is inserted through the socket of the carriage when the carriage sits over the entry zone of the guide structure. In this arrangement all the structures of the connector are in contact but are not engaged firmly with one another, and the male projection can be easily withdrawn from the carriage socket.

Figure 5C:
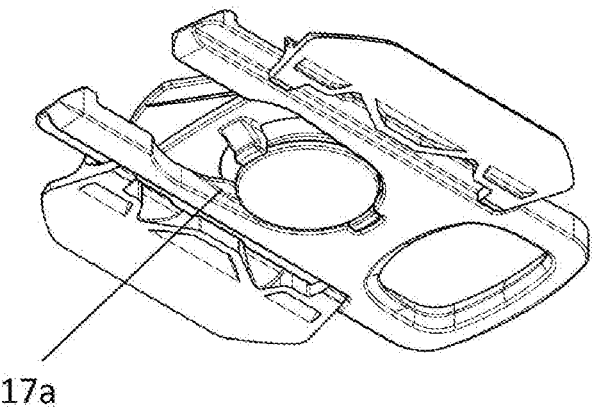

FIG. 5c shows the configuration of these structures when the male projection is inserted through the socket of the carriage when the carriage has been moved along the length of the guide cavity to sit over the compression zone. The passage of the projection head up on to the projecting ledge 17 is assisted by the angle ramping surfaces 17a formed at the ends of the projecting ledge.

FIGS. 6a and 6b also show an underside view and side cross-section view of the assembled engaged connector illustrated with respect to FIG. 5c.

In this configuration the smaller diameter of the guide cavity compression zone applies a force which urges the head of the male structure projection through and away from the socket of the carriage structure. This action results in the guide structure being engaged with the stem of the male structure projection and prevents the head of the male structure projection from being withdrawn from the socket of the carriage structure. Concurrent with the engagement of the guide structure with the male structure projection, a portion of the perimeter of the carriage structure socket 9 is also compressed between the guide structure and the base of the male structure.

FIG. 6a shows how the rigid guide structure is used in this configuration to compress and lock together the soft flexible nylon carriage structure and male structure.

In the embodiment shown the guide structure is formed from a hard polycarbonate material, while each carriage and male structure is formed from soft nylon. In the embodiment shown, the hard material of the guide structure is polycarbonate. In the embodiment shown, the soft material of the is nylon.

In use the male projection may be inserted through the socket of the carriage structure with the carriage structure being moved along the longitudinal length of the guide cavity to connect and disconnect the three components.

When the carriage and associated male structure are positioned adjacent to the guide cavity's entry zone these three components may be easily separated from one another, allowing for separation of the flexible articles sewn to each of the male and carriage structures.

When the carriage and associated male structure are positioned adjacent to the guide cavities compression zone the smaller diameter of the guide cavity applies a force which urges the head of the male structure projection through and away from the socket of the carriage structure. This action results in the guide structure being engaged with the stem of the male structure projection and prevents the head of the male structure projection from being withdrawn from the socket of the carriage structure. Concurrent with the engagement of the guide structure with the male structure projection, at least a portion of the perimeter of the carriage structure socket is also compressed between the guide structure and the base of the male structure.

In various preferred embodiments the guide structure may define at least one track or projecting rail which has a longitudinal axis running parallel to the longitudinal axis of the guide cavity. In such embodiments the carriage structure may also form or define a complimentary receiving cavity to engage with such a track on the guide, these two features cooperating with each other to guide or control the motion of the carriage as it traverses the guide cavity. In a further preferred embodiment the guide structure may define a pair of tracks, each located on the opposite exterior edge of the guide structure running the length of the guide cavity. This pair of tracks can guide the motion of the carriage structure in addition to locking the carriage structure on to the guide structure.

Those skilled in the art will also appreciate that alternative arrangements of such tracks and complimentary receiving cavities can be utilised in other embodiments. For example, in some alternative embodiments one or more projecting tracks may be formed by the carriage structure, with a complimentary receiving cavity or cavities being formed in the guide structure. With such embodiments this combination of track and receiving cavity may again guide the motion of the carriage relative to the guide structure and also preferably lock the carriage to the guide structure.

In alternative embodiments the materials of the carriage may be substituted for the material of the male structure and the material of the male structure may be substituted for the material of the carriage.

In use the male projection may be inserted through the socket of the carriage structure with the carriage structure being moved along the longitudinal length of the guide cavity to connect and disconnect the three components.

When the carriage and associated male structure are positioned adjacent to the guide cavity's entry zone these three components may be easily separated from one another, allowing for separation of the flexible articles sewn to each of the male and carriage structures.

When the carriage and associated male structure are positioned adjacent to the guide cavities compression zone the smaller diameter of the guide cavity applies a force which urges the head of the male structure projection through and away from the socket of the carriage structure. This action results in the guide structure being engaged with the stem of the male structure projection and prevents the head of the male structure projection from being withdrawn from the socket of the carriage structure. Concurrent with the engagement of the guide structure with the male structure projection, at least a portion of the perimeter of the carriage structure socket is also compressed between the guide structure and the base of the male structure.

In various preferred embodiments the guide structure may define at least one track or projecting rail which has a longitudinal axis running parallel to the longitudinal axis of the guide cavity. In such embodiments the carriage structure may also form or define a complimentary receiving cavity to engage with such a track on the guide, these two features cooperating with each other to guide or control the motion of the carriage as it traverses the guide cavity. In a further preferred embodiment the guide structure may define a pair of tracks, each located on the opposite exterior edge of the guide structure running the length of the guide cavity. This pair of tracks can guide the motion of the carriage structure in addition to locking the carriage structure on to the guide structure.

Those skilled in the art will also appreciate that alternative arrangements of such tracks and complimentary receiving cavities can be utilised in other embodiments. For example, in some alternative embodiments one or more projecting tracks may be formed by the carriage structure, with a complimentary receiving cavity or cavities being formed in the guide structure. With such embodiments this combination of track and receiving cavity may again guide the motion of the carriage relative to the guide structure and also preferably lock the carriage to the guide structure.

Various embodiments of the invention provide an improved connector which facilitates a strong secure connection between two soft or flexible surfaces.

These embodiments allow the number of components to be sewn to articles to be connected together, providing a flexible engagement to the intermediary connector provided by the invention.

In various embodiments of the invention the connector can be quickly and easily engaged and disengaged from a number of angles by a user who does not necessarily need to see the connector to operate it.

In various embodiments of the invention the components of the connector can be implemented to provide the operator with nonvisual feedback on the orientation and also configuration of the components of the connector relative to each other.

In various embodiments the invention can also provide a connector which has a relatively flat or low profile, facilitating use of the invention in furniture focused applications.

In some embodiments the locking together of the carriage and male structure is provided by friction between the carriage and male structure.

Embodiments of the present invention provide a connector with the ability to engage a soft or and/or flexible article.

In various preferred embodiments the connector provided can act as an intermediary element to allow such soft flexible articles to be interchangeably connected and disconnected from one another. However, in other embodiments the connector provided may engage with a flexible article and connect this article to a further rigid or hard surface if required.

The reader will appreciate that compression of the carriage and male structure may place the projection 3 under tension. The reader will also appreciate that resilient strain in the projection 3 will maintain compression of the carriage structure and male structure. The reader will appreciate that resilient strain in the projection 3 may be substituted in alternative embodiments for resilience under compression required by the carriage. The reader will further appreciate that in these embodiments the carriage of the preferred embodiment, which is formed of a soft nylon to allow compression, may be substituted for a harder material.

In alternative embodiments of the invention the stitching tags may be substituted for tags which are suitable for affixing by means known as alternatives for stitching. These means may include bonding, fusing, riveting and adhering to give some examples.

Embodiments of the present invention provide a connector with a male structure which is received unimpeded into a carriage structure before it is locked in place. In some embodiments this unimpeded receiving is arranged by the carriage having a socket which has a diameter greater than the male structure. In some embodiments this unimpeded receiving and locking is arranged by the locking being arranged by a guide which has a socket with an entry zone which has a greater diameter than the male structure so that the guide does not impede male structure being received in the carriage. These embodiments allow the male structure or carriage structure to secure items with flexible articles that may not be well adapted to transferring force to overcome any mechanical impedance.

In various embodiments the guide having a compression zone into which the male structure moving relative to the guide moves to cause compression forces with a magnitude that is multiples of the magnitude of force which is required for the male structure to be received in the carriage. This may overcome a problem associated with flexible elements to be connected in that the flexible articles can transfer only limited force by nature of their flexibility. This is particularly where articles require secure connection despite not being suitable to transfer force for a connector.

In various embodiments the guide, carriage and male structure are locked in place by friction. In some embodiments the friction is facilitated by compression. In alternative embodiments to the present invention pressure to cause compression is traded for frictional properties of the parts.

Embodiments of the present invention provide a connector with a male structure which is locked to a carriage by a force applied to a guide transverse to the male structure. This may secure articles which may lie substantially flat on a surface to which the article is to be secured, or another article, because movement of parts, the guide in these examples, is substantially along a juncture between the article and surface or between two articles.

The reader will appreciate that in some embodiments an entry zone of the guide cavity with a diameter greater than the diameter of the head of the projection of the male structure may be to allow entry of the head into the guide cavity and/or entry of the head into the socket.

In some embodiments the guide acts to force between the head of the projection of the male structure and the carriage to press the carriage against the base of the male structure.

In alternative embodiments undercuts may be provided by two or more projections.

In alternative embodiments any alternative shape to a U-shape guide cavity may be used and may include semi-ellipses, open rectangles, or V-shapes and suitable adaptions to the geometry of the ramp will be apparent to the reader.

It is to be understood that the invention is not limited to the embodiments described herein and further and additional embodiments within the spirit and scope of the invention will be apparent to the skilled reader from the examples illustrated with reference to the drawings. In particular, the invention may reside in any combination of features described herein, or may reside in alternative embodiments or combinations of these features with known equivalents to given features. Modifications and variations of the example embodiments of the invention discussed above will be apparent to those skilled in the art and may be made without departure of the scope of the invention.

What is claimed is:

1. A connector for a soft or flexible article, the connector including
    a male structure comprising a base and a projection, the projection defining a head and a stem connecting the head to the base, the head having a diameter greater than the diameter of the stem, the male structure base defining at least one tag extending substantially perpendicular to the projection, and
    a carriage structure comprising a base which defines a socket arranged to receive the projection of the male structure, the carriage structure defining at least one tag extending substantially parallel to the socket, and
    a guide structure which defines a guide cavity arranged to receive the male structure projection when the male structure projection is located within the socket of the carriage structure, the guide cavity defining an entry zone and a compression zone, the entry zone having a diameter greater than the diameter of the male structure projection head and the compression zone having a diameter less than the diameter of the male structure projection head,
    wherein movement of the carriage structure relative to the guide structure along the length of the guide cavity from the entry zone to the compression zone compresses at least a portion of the perimeter of the carriage structure socket between the guide structure and the base of the male structure.

2. The connector of claim 1 wherein movement of the carriage structure relative to the guide structure along the length of the guide cavity from the entry zone to the compression zone applies a force which urges the male structure projection through and away from the socket of the carriage structure.

3. The connector of claim 1 wherein movement of the carriage structure relative to the guide structure along the length of the guide cavity from the entry zone to the compression zone engages the guide structure with the stem of the male structure projection and prevents the head of the male structure projection from being withdrawn from the socket of the carriage structure.

4. The connector of claim 1 wherein said at least one tag of the male structure is formed from a flexible material.

5. The connector of claim 1 wherein said at least one tag of the carriage structure is formed from a flexible material.

6. The connector of claim 1 wherein either or both of the entire carriage and/or male structures may be formed from a soft flexible material which facilitates stitched connections to a flexible article.

7. The connector of claim 1 wherein either or both of the entire carriage and/or male structures may have a soft flexible material co-moulded over another rigid material to define the stitching tag and base required.

8. The connector of claim 1 wherein the base of the male structure defines a projection which extends with a substantially perpendicular orientation to any stitching tag or tags formed by the structure.

9. The connector of claim 1 wherein the base of the carriage structure also defines a socket arranged to receive the male structure projection, with this socket being aligned approximately parallel to any tags defined by the carriage structure.

10. The connector of claim 1 wherein the socket is defined by an aperture with a substantially complementary form or shape to that of the head of the male structure projection and has a diameter, width or length substantially equal to or slightly larger than the diameter of the head of the male structure projection.

11. The connector of claim 1 wherein a carriage track formed on the guide structure also comprises a lateral undulation, projection or recess capable of marking the point of transition between the guide cavity entry zone and compression zone.

12. The connector of claim 1 wherein the guide structure is arranged to at least partially enclose a section of the male projection, where the guide cavity has a span, width or diameter which varies over the longitudinal length of the guide cavity.

13. The connector of claim 1 wherein the diameter of the compression zone is less than the diameter of the entry zone.

14. The connector of claim 13 wherein the lesser diameter of the guide cavity compression zone compared to the entry zone is arranged by a projecting ledge extending around the perimeter of the entry zone within the guide cavity.

15. The connector of claim 1 wherein the guide structure defines an aperture which can be used by an operator as a handle or finger pull system to move the carriage structure relative to the guide structure.

16. The connector of claim 14 wherein one or more angled ramping surfaces are arranged at ends of the projecting ledge to provide a smooth transition for the head of the male structure projection on to the ledge as it travels relatively to the carriage structure through to the compression zone.

\* \* \* \* \*